United States Patent
Witzel et al.

(10) Patent No.: US 9,413,898 B2
(45) Date of Patent: Aug. 9, 2016

(54) TECHNIQUE FOR INTERCONNECTING CIRCUIT-SWITCHED AND PACKET-SWITCHED DOMAINS

(75) Inventors: Andreas Witzel, Herzogenrath (DE); Ralf Keller, Würselen (DE); Hans-Peter Lippelt, Neuss (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 248 days.

(21) Appl. No.: 12/299,346

(22) PCT Filed: May 4, 2006

(86) PCT No.: PCT/EP2006/004197
§ 371 (c)(1),
(2), (4) Date: Nov. 3, 2008

(87) PCT Pub. No.: WO2007/128329
PCT Pub. Date: Nov. 15, 2007

(65) Prior Publication Data
US 2010/0177764 A1 Jul. 15, 2010

(51) Int. Cl.
*H04M 7/12* (2006.01)
*H04L 29/06* (2006.01)

(52) U.S. Cl.
CPC ............. *H04M 7/123* (2013.01); *H04L 69/08* (2013.01); *H04L 69/18* (2013.01)

(58) Field of Classification Search
None
See application file for complete search history.

(56) References Cited

U.S. PATENT DOCUMENTS

| | | | |
|---|---|---|---|
| 2002/0024943 A1* | 2/2002 | Karaul et al. | 370/338 |
| 2002/0191596 A1* | 12/2002 | Moyano et al. | 370/352 |
| 2003/0026245 A1* | 2/2003 | Ejzak | 370/352 |
| 2003/0027569 A1 | 2/2003 | Ejzak | |
| 2004/0196867 A1* | 10/2004 | Ejzak et al. | 370/468 |
| 2005/0271055 A1* | 12/2005 | Stupka | 370/389 |
| 2006/0043164 A1* | 3/2006 | Dowling et al. | 235/375 |
| 2006/0105766 A1* | 5/2006 | Azada et al. | 455/432.1 |
| 2006/0291488 A1* | 12/2006 | Naqvi et al. | 370/401 |

* cited by examiner

*Primary Examiner* — Brian Roberts (57) ABSTRACT

A technique for providing circuit-switched call services for a call stretching between a packet-switched domain and circuit-switched domain is provided. A possible server implementation of this technique includes a first interface adapted to receive packet-switched protocol messages requesting circuit-switched call services, a service component providing the requested call services, and a second interface adapted to pass call control towards the circuit-switched domain after the call services have been provided.

16 Claims, 5 Drawing Sheets

TECHNIQUE FOR INTERCONNECTING CIRCUIT-SWITCHED AND PACKET-SWITCHED DOMAINS

FIELD OF THE INVENTION

The present invention generally relates to a technique for interconnecting circuit-switched (CS) and packet-switched (PS) domains. In particular, the invention relates to the provision of CS services to a network component having a PS network access.

BACKGROUND OF THE INVENTION

Many network operators are currently migrating towards layered CS network architectures. Whereas in conventional second generation networks a single component, the mobile switching center (MSC), handles both call control and connectivity, in layered networks these functionalities have been split. More specifically, call control is handled by MSC servers (MSC-Ss) on the control layer, whereas connectivity is handled by media gateways (MGWs) on the transport layer. This separation of call control and connectivity is also referred to as mobile softswitching (MSS).

The MSC-S is responsible for control signalling and contains service logic for setting up, releasing and monitoring CS connections. The MGW, on the other hand, processes and manages the transport of CS payload traffic (such as voice or data traffic). The MGW also provides interconnections to external networks including public switched telephone networks (PSTNs) and public land mobile networks (PLMNs). Separating the service and control functions from payload transport is advantageous for operators who wish to expand into new geographical areas. All they have to do is to install additional MGWs in the new areas for payload transport. The newly installed MGWs may then be connected to existing MSCs and MSC-Ss.

In parallel to the deployment and operation of layered CS networks, there exist efforts to provide new service delivery platforms for offering enhanced multimedia and other communication services. One of these new service platforms is the Internet protocol (IP) multimedia subsystem (IMS) defined by the $3^{rd}$ generation partnership project (3GPP). IMS represents a service delivery platform for the provision of IP-based multimedia services within emerging all-IP network environments. IMS relies on the Session Initiation Protocol (SIP) for session control. SIP has a strong peer-to-peer character and introduces so-called user agents (UA) that terminate each communication link.

Figure 1:
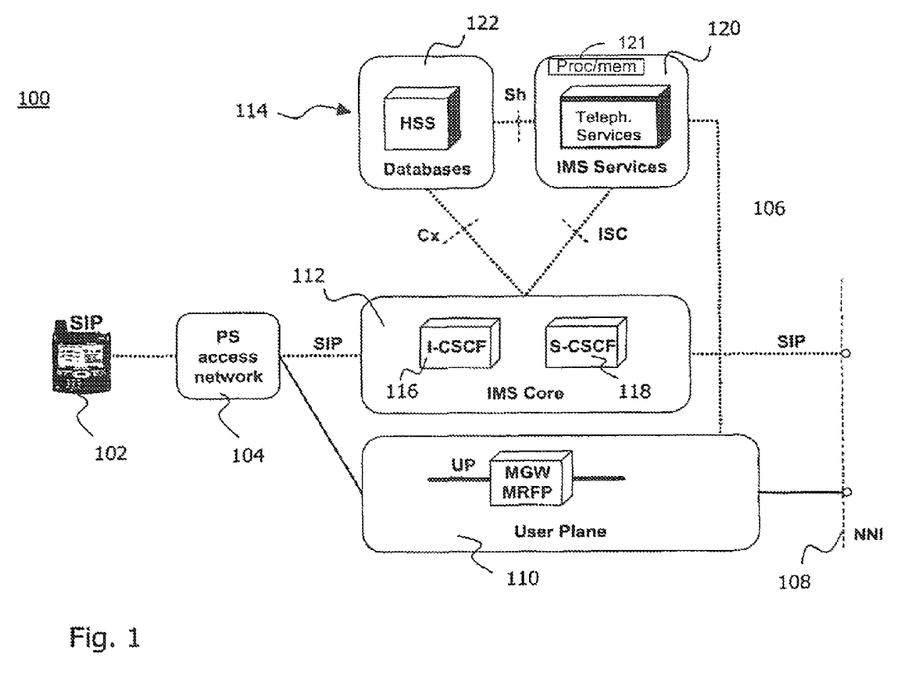
FIG. 1 is a schematic block diagram showing a typical network scenario including an IMS.

FIG. 1 shows a typical configuration of a communication scenario 100 including a SIP-enabled user terminal 102 connected via a PS access network 104 to an IMS 106. The IMS 106 may in turn be connected via a network-network interface (NNI) 108 to one or more further networks such as another IMS or a layered CS network (not shown).

The IMS 106 has a layered internal structure including a transport layer (or user plane) 110, a control layer (or IMS core) 112 and an application layer (or service plane) 114. The transport layer 110 comprises a media resource function processor (MRFP) implementing payload-related functions and an IMS-MGW interfacing for example a layered CS network.

The control layer 112 comprises several functionalities for processing SIP signalling (SIP proxies) that are collectively called call/session control function (CSCF). More specifically, the control layer 112 includes an interrogating CSCF (I-CSCF) 116 sitting at the network border and providing a single point of entry (and exit), as well as a serving CSCF (S-CSCF) 118 responsible for handling session registrations and for routing of SIP messages to the application layer 114.

On the application layer 114, there exist one or more service components 120 providing the service logic for call services such as telephony services and multimedia services, including a microprocessor with an associated persistent memory 121 storing instructions for execution by the microprocessor. Associated with the IMS services Additionally, one or more database servers including a home subscriber server (HSS) 122 reside on the application layer 114. The HSS 122 stores a service profile for each subscriber and can thus be regarded as the equivalent to the home location register (HLR) in second and third generation networks.

As shown in FIG. 1, the service component 120 and the HSS 122 communicate via the standardised Sh interface. Communication between the HSS 122 and the control layer 112 takes place via the standardised Cx interface, and a likewise standardised IMS service control (ISC) interface is used for communication between the control layer 112 and the one or more service components 120.

It is currently not clear how the evolution from the currently deployed MSS networks to the IMS network 106 as shown in FIG. 1 or other SIP-based networks will take place. However, is clear that network operators with an installed MSS environment, or with the intention to deploy MSS, will want to ensure a smooth transition from MSS and the CS domain to an all-IP solution. From a migration perspective, and also with regard to a re-use of installed equipment, operators might prefer to use CS services (such as CS telephony services) and CS infrastructure during a co-existence period also for IMS subscribers having PS network access.

It can be assumed that in the migration phase from conventional CS networks to SIP-based PS networks, a high percentage of calls will stretch between the CS domain and the PS domain (e.g. the IMS). This assumption is based on the fact that in the beginning there will be only a few IMS subscribers, whereas the majority of possible destinations is still located in the traditional CS domain, or is served by a softswitch solution.

Accordingly, there is a need for a technique for efficiently interconnecting the CS and PS domains.

SUMMARY OF THE INVENTION

According to a first aspect of the invention, a server for providing CS services for a call stretching between a PS domain and a CS domain is provided. The server comprises a first interface adapted to receive PS protocol messages requesting CS services for a call, a service component providing the requested CS services for the call, and a second interface adapted to pass call control towards the CS domain after the CS services have been provided.

The server is preferably located on an application layer. In such a scenario the first interface may be directed towards a control layer for receiving the PS protocol messages. The second interface, on the other hand, may be provided for a direct break-out to the CS domain. With such a configuration, the interworking between a SIP-based network such as an IMS on the one hand and a CS network on the other hand may be improved.

The server may additionally comprise a converter adapted to convert the content of the PS protocol messages in a format interpretable by the service component. The service component may then provide the CS services in accordance with the converted content. This approach allows for a re-use of existing CS network components as the content may be converted into a CS protocol format.

The server may additionally comprise a decision (or routing) logic adapted to decide about the further course of the call path. In one example, the decision logic is applied to dynamically implement call control. With respect to call control, the decision logic may be used to decide if call control is to be passed back via the first interface or if call control is alternatively to be passed via the second interface towards the CS domain (and thus possibly out of the PS domain).

According to a further variation, the server includes means for handling subscriber data. The subscriber data handling means may comprise at least one of a third interface for receiving subscriber data and a storage for subscriber data. According to a preferred implementation, the server includes a third interface for receiving subscriber data and additionally a storage for storing the subscriber data received via the third interface. The subscriber data may include subscriber settings and/or subscriber preferences. The subscriber data may be indicative of one or more services that need to be applied to a particular call involving a particular subscriber (either as an originating or terminating endpoint).

The decision logic implemented at the server may be adapted to take into account subscriber data associated with a particular call. In other words, the decision if call control is to be passed back via the first interface or if call control is to be passed via the second interface towards the CS domain may be based at least partially on subscriber data associated with the call. Additionally, or in the alternative, the service component may be adapted to provide the CS services taking into account subscriber data associated with the call. This means that the CS services provided by the service components may at least partially be based on subscriber data associated with the call.

The PS protocol messages received by the server via the first interface may be SIP messages or messages according to another control protocol with similar functionalities. In such a case, the first interface may be configured as an ISC interface bridging IMS control and application layers. The second interface towards the CS domain may be configured as an integrated services digital network user part (ISUP) interface. Additionally, or in the alternative, the second interface may be configured as a bearer independent call control (BICC) interface. According to a still further possibility, the second interface or a dedicated further interface of the server may be configured as a direct transfer application part (DTAP) and/or a base station system management application part (BSS-MAP) interface.

The CS services provided by the service component may include one or more functionalities of a MSC. Alternatively, or in addition, the service component may provide one or more functionalities of an MSC-S. These functionalities may include network control signalling and service logic in context with setting up, releasing and monitoring connections stretching into the CS domain.

According to a further aspect of the invention, an IMS comprising a server as described herein is provided. The server is preferably located on an application layer of the IMS and is adapted to receive SIP messages from an underlying control layer via the ISC interface. In the IMS, the server preferably may be co-located with an MSC-S. The combination of an MSC-S with the server provides the server with a direct radio access towards the CS domain. In certain situations, such an arrangement allows the direct termination in the CS domain of a call originating from the PS domain without the need of using a CS-NNI.

According to a still further aspect of the present invention, a method of providing CS services for a call stretching between a PS domain and a CS domain is provided. The method comprises the steps of receiving PS protocol messages requesting CS services for a call, providing the requested CS services for the call, and passing call control towards the CS domain after the CS services have been provided. The latter step may be implemented by a direct brakeout towards the CS domain, i.e. without passing call control back to e.g. a control layer.

The steps of the method are preferably performed by a dedicated application server. The dedicated application server may belong to a group of several application servers, wherein each application server is adapted for being linked into a call path. In such a scenario, the dedicated application server is preferably linked as first application server into the call path. In other words, when passing call control from the control layer to the application layer, the dedicated application server may be the first component on the application layer to take over call control.

The method may further comprise the step of deciding if call control is to be passed back to a component in the PS domain, or in the alternative, if call control is to be passed (directly) towards the CS domain. This decision may be based on various parameters, including one or more of the following: subscriber data associated with the call, the requirement of linking further application servers into the call, the content type (e.g. voice only, data only, or multimedia) of the call, and a destination address (or destination domain such as PS or CS) of the call.

In one implementation, the method allows for a switching between two or more different modes of operation, in particular following the provision of the CS services. A first mode of operation may include mandatorily passing call control towards the CS domain. A second mode of operation may include mandatorily passing call control towards the PS domain. A third mode of operation may include dynamically deciding if call control is to be passed towards the PS domain or if call control is to be passed towards the CS domain. Of course, additional or alternative modes of operation could also be implemented.

Various types of CS services may be provided for the call. In one scenario, the provided CS services are telephony services as typically provided by at least one of an MSC and an MSC-S.

BRIEF DESCRIPTION OF THE DRAWINGS

In the following, the invention will be described with reference to exemplary embodiments illustrated in the drawings, in which.

DETAILED DESCRIPTION OF PREFERRED EMBODIMENTS

In the following description, for purposes of explanation and not limitation, specific details are set forth, such as particular signal formats, messaging protocols, etc. in order to provide a thorough understanding of the current invention. It will be apparent to one skilled in the art that the current invention may be practised in other embodiments that depart from these specific details. For example, the skilled artisan will appreciate that the current invention may be practised using PS protocols different from the SIP protocol discussed below to illustrate the present invention. Also, the invention may be practised using CS protocols different from the ISUP BICC, and DTAP protocols mentioned below.

Those skilled in the art will further appreciate that functions explained herein below may be implemented using individual hardware circuitry, using software functioning in conjunction with a programmed micro processor or general purpose computer, using an application specific integrated circuit (ASIC), and/or using one or more digital signal processors (DSPs). It will also be appreciated that while the current invention is primarily described as a method, it may also be embodied in a computer processor and a memory coupled to the processor, wherein the memory is encoded with one or more programs that perform the methods disclosed herein.

Figure 2:
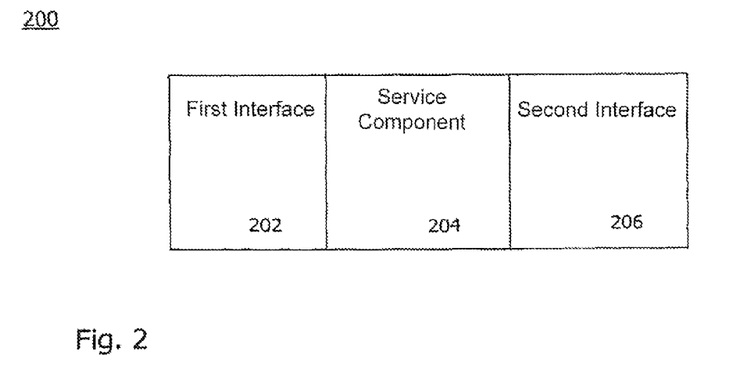
FIG. 2 is a schematic block diagram showing a first device embodiment of the present invention.

FIG. 2 shows a block diagram of a first embodiment of a server 200 adapted to provide CS services for a call stretching between a PS domain and a CS domain. The server 200 is configured as an application server and, in a layered network configuration, may therefore be located on an application layer.

With reference to FIG. 2, the server 200 comprises a first interface 202 for receiving PS protocol messages requesting CS services for a call. The call may originate from a user terminal having a PS network access and terminate at a user terminal located in the CS domain. However, other call scenarios are also possible. As an example, both the originating user terminal and the terminating user terminal may be located in the CS domain, and the call may be routed at least partially through the PS domain.

The server 200 further includes a service component 204 for providing the CS services requested by the PS protocol messages received via the first interface 202. The CS services provided by the service component 204 may include telephony services. If required, the service component 204 may alternatively, or additionally, provide multimedia or other services.

As shown in FIG. 2, the server 200 further comprises a second interface 206 for passing call control towards the CS domain after the CS services have been provided by the service component 204. The second interface 206 is preferably an interface separate from the first interface 202. It should be noted that the second interface 206 need not be utilized for each call. In other words, in certain situations it may be decided not to pass call control, via the second interface 206, towards the CS domain. Rather, call control may also be passed back via the first interface 202 (and the call may thus possibly remain in the PS domain).

Figure 3:
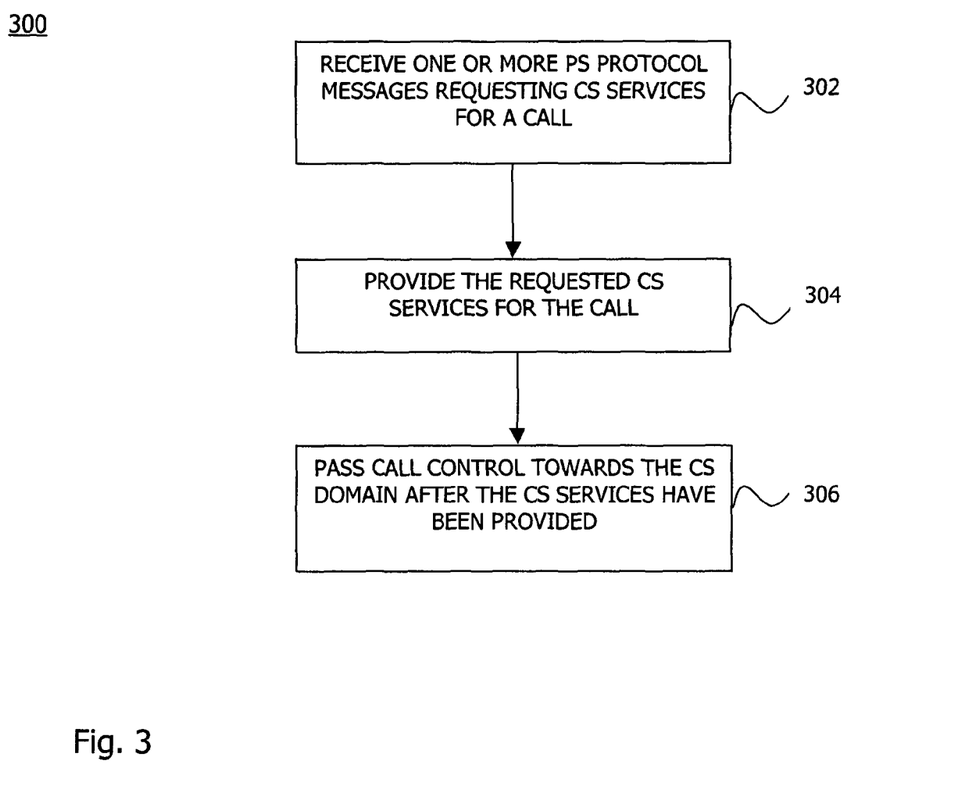
FIG. 3 is a schematic flowchart illustrating a method embodiment of the present invention.

With reference to FIG. 3, a flowchart 300 shows the individual steps of a method embodiment of the present invention. The method embodiment shown in FIG. 3 can be implemented using the server 200 of FIG. 2 or using a server having a different configuration.

The method starts, in step 302, with receiving PS protocol messages requesting CS services for a call. The PS protocol messages may be received from an underlying control layer.

In a next step 304, the CS services requested for the call are provided. The CS services may relate to session control such as setting up, monitoring and releasing a connection towards the CS domain.

Once the requested CS services have been provided in step 304, in step 306 call control is passed towards the CS domain. Step 306 may be performed in various ways. In one example, call control is selectively passed towards the CS domain depending on one or more predefined parameters.

In the following, further embodiments of the present invention will be described with reference to FIGS. 4 to 8. These embodiments are based on a communication scenario similar to the one shown in FIG. 1. Accordingly, identical components will be denoted with the same reference numerals. The major differences between the scenario of FIG. 1 and the present embodiments will be emphasized where appropriate.

Figure 4:
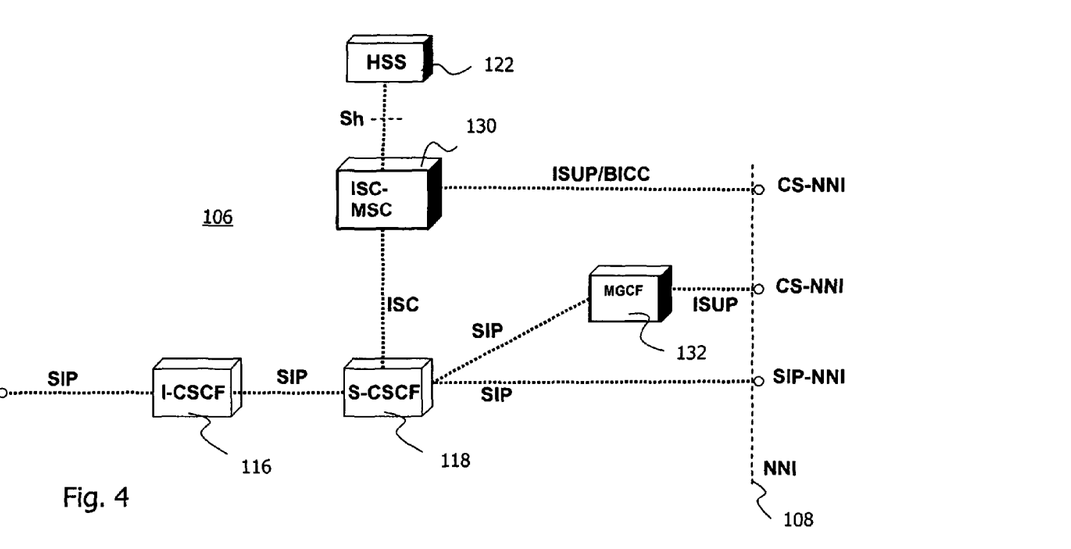
FIG. 4 is a schematic block diagram illustrating a network embodiment of the present invention.

FIG. 4 shows an IMS 106 to which, as shown in FIG. 1, a SIP-enabled user terminal 102 may be coupled via a PS access network 104. Compared to the IMS of FIG. 1, the IMS 106 of FIG. 4 additionally comprises a media gateway controller function (MGCF) 132 interfacing, via the NNI 108, with the transport layer (or media plane) of a layered CS network. In this context, the MGCF 132 performs conversion tasks between SIP and ISUP.

As a further difference, the IMS application server 120 of FIG. 1 has been replaced by a dedicated ISC-MSC application server 130. As shown in FIG. 4, the ISC-MSC 130 has a direct ISUP/BICC connection via the NNI 108 to the CS domain. By this brakeout from the application layer to the CS domain, the ISC-MSC 130 optimizes IMS-CS inter-working. Functionally, the ISC-MSC 130 constitutes an MSC-S with an additional ISC interface to the IMS core or, more specifically, to the S-CSCF 118.

Figure 5:
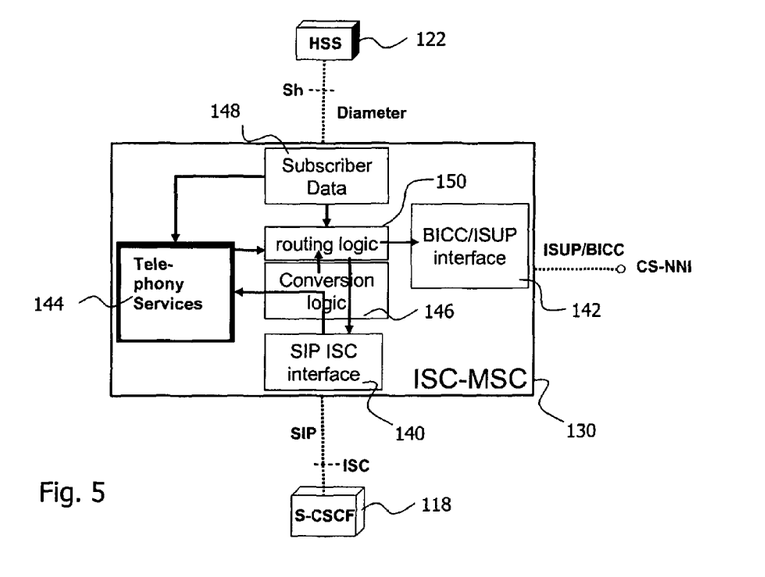
FIG. 5 is a schematic block diagram illustrating a further device embodiment of the present invention.

FIG. 5 illustrates the individual functional entities of the ISC-MSC 130 in more detail. As shown in FIG. 5, the ISC-MSC 130 includes an ISC interface 140 for receiving SIP messages from the S-CSCF 118. The ISC interface 140 is implemented as an ISC interface handler capable of communicating with the S-CSCF 118 via SIP messages.

The ISC-MSC 130 further includes a BICC/ISUP interface 142 for being coupled to the CS-NNI 108. The BICC/ISUP interface 142 is implemented as a BICC/ISUP interface handler capable of communicating with CS components via BICC/ISUP messages.

The core entity of the ISC-MSC 130 is a service component 144 including CS telephony service logic as conventionally implemented in a MSC-S. If required, the service component 144 may additionally perform multimedia or other services.

SIP messages received by the ISC-MSC 130 via the ISC interface 140 are first processed by a conversion logic implemented in the form of a converter 146. The converter 146 ensures that the received SIP messages can call telephony services within the service component 144. To this end, the converter 146 converts the content of the received SIP messages into a format that can be interpreted by the service component 144, thus enabling the service component 144 to provide the requested telephony services.

In one variation, the telephony services are provided by the service component 144 dependent on subscriber data. Accordingly, the ISC-MSC 130 additionally comprises a storage 148 for subscriber data. The subscriber data included the storage 148 have been received from the HSS 122 via a dedicated Sh interface (in FIG. 5 the corresponding interface handler for the ISC-MSC 130 has been omitted) and in accordance with the DIAMETER protocol.

The ISC-MSC 130 further includes a routing component 150 for deciding about the further call path once the services have been provided by the service component 144. The routing component 150 basically decides if call control is to be passed back via the ISC interface 140 to the S-CSCF 118 or, in the alternative, if call control is to be passed via the BICC/

ISUP interface 142 to the CS domain. The decision performed by the routing component 150 may be based on various parameters including subscriber data stored in the storage 148. If it is decided that call control is to be passed to the CS domain, the routing component 150 may call the converter 146 for converting any messages received from the service component 144 after the requested CS services have been provided into the appropriate CS format (such as the BICC format or the ISUP format).

Now, the functionalities of the ISC-MSC 130 will be described with reference to the IMS scenario of FIG. 6 and an exemplary call path (dashed arrow). In the scenario shown in FIG. 6 it is assumed that a call initiated in the PS domain will be terminated in the CS domain. Of course, the invention can also be practised in other scenarios. Note that the IMS 106 may comprise further application servers 134, 136 in addition to the ISC-MSC 130.

Figure 6:
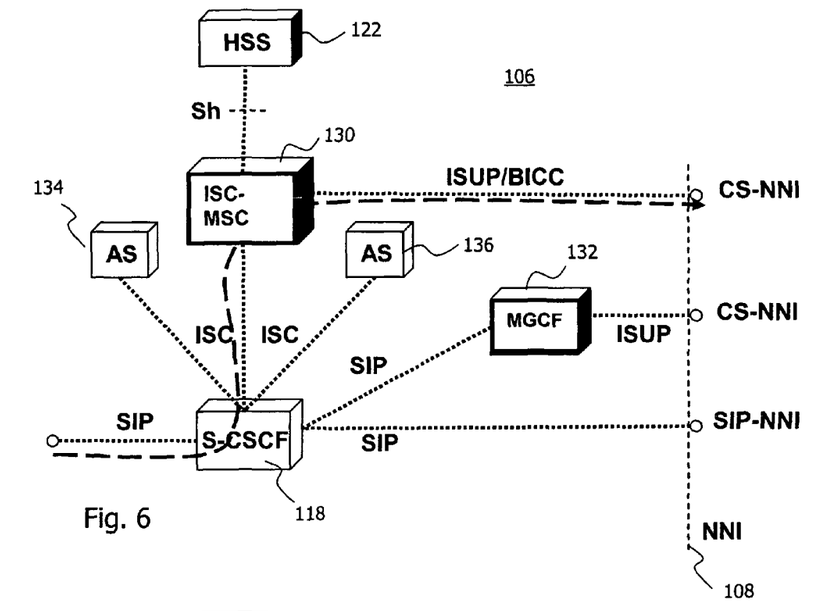
FIG. 6 is a first combined signalling/block diagram derived from the network embodiment shown in FIG. 4.

As shown in FIG. 6, a call from a SIP-enabled user terminal is first routed to the S-CSCF 118. The S-CSCF 118 determines that the call requires certain CS call services and therefore routes the call to the application layer. The S-CSCF 118 is configured to route the call, upon detection of the necessity of CS call services, to the ISC-MSC 130 first. In other words, the ISC-MSC 130 will be linked as the first application servers in the call path and is thus given preference over the remaining application server 134, 136. Such a preference can be implemented by an appropriate setting of the initial filter criteria (iFC) in the subscriber data stored in the HSS 120.

Once the ISC-MSC 130 receives call control from the S-CSCF 118 via a SIP message, and is thus requested to provide CS services for the call, there exist various call handling alternatives for the ISC-MSC 130.

According to a first call handling alternative, the ISC-MSC 130, upon receipt of call control, fetches the subscriber data associated with the respective call from the HSS 122 and stores the fetched subscriber data in the storage 148 shown in FIG. 5. The subscriber data fetched from the HSS 122 include the iFC. From the iFC the ISC-MSC 130 can derive whether or not it is necessary to link one or more of the further application servers 134, 136 into the call (and in which order).

For a CS subscriber just being migrated to an IMS architecture but still receiving the "conventional" CS telephony services, it is very likely that no other application server 134, 136 need to be involved. In such a case, the ISC-MSC 130 does not pass call control back to the S-CSCF 118. Rather, after the telephony services have been executed by the service component 144, the call is routed directly to the CS domain via the BICC/ISUP interface 142 (thus re-using the conventional routing interface of the underlying MSC-S from which the ISC-MSC 130 has evolved). This situation is shown in FIG. 6.

Figure 7:
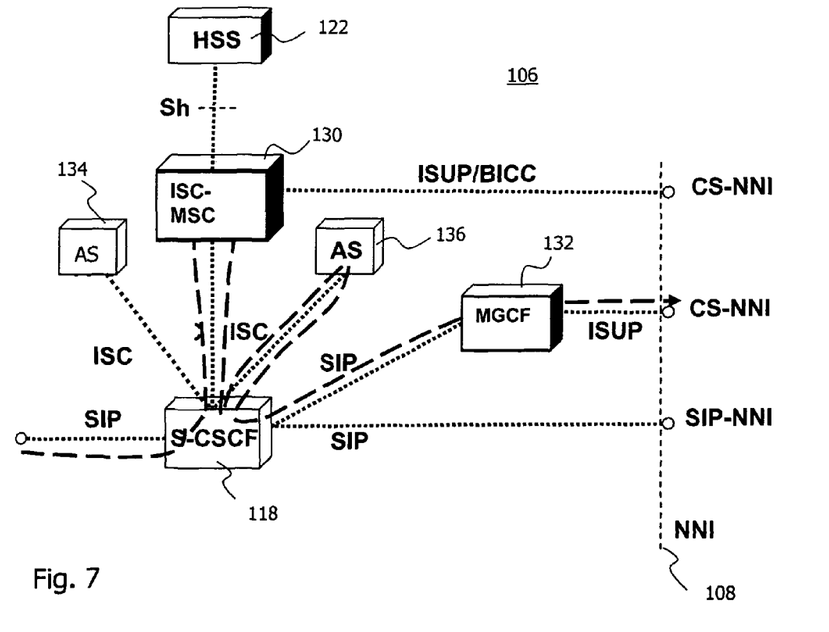
FIG. 7 is a second combined signalling/block diagram derived from the network embodiment shown in FIG. 4.

If, on the other hand, the ISC-MSC 130 determines that one or more further application servers need to be linked into the call path, call control is passed back to the S-CSCF 118 as shown in FIG. 7. The S-CSCF 118 then links in one or more further application servers as exemplarily shown in FIG. 7 for the application server 136. The order in which the further application servers 134, 136 are linked in the call path may be defined (e.g. in the iFC).

After the application server 136 has handled the call, call control will again be passed back to the S-CSCF 118. Once the S-CSCF 118 determines that no further application servers need to be linked into the call path, and a further analysis of the destination address indicates that a brakeout to the CS domain is needed, call control is passed to the MGCF 132. The MGCF 132 converts the corresponding one or more SIP messages received in this context from S-CSCF 118 into one or more corresponding ISUP messages and forwards the ISUP messages via the NNI 108 towards the CS domain.

The first call handling alternative discussed above has assumed that the ISC-MSC 130 has fetched subscriber data from the HSS 122 in order to determine whether or not call control received from the S-CSCF 118 has to be passed back to the S-CSCF 118. According to a second call handling alternative, the ISC-MSC 122 does not fetch subscriber data from the HSS 122 (in which case the storage 148 could be omitted). Rather, after execution of the telephony services, the ISC-MSC 130 always routes the call directly to the CS domain via the BICC/ISUP interface 142.

According to a third call handling alternative, the ISC-MSC 130 does not fetch any subscriber data (similar to the second alternative). After the requested telephony services have been provided, call control is always passed back to the S-CSCF 118 for conventional IMS call handling. In one variation, the ISC-MSC 130 is provided with a mechanism (such as a management interface, not shown) for controlling the switching between two or more of the modes of operation (handling alternatives) described above.

According to a further variation, the behaviour of the ISC-MSC 130 of FIG. 5 as regards the passing of call control may depend on the content type of the call for which CS call services have been requested. The content type of the call may for example be derived from session description protocol (SDP) information relating to the call. SDP describes the transport layer (or user plane) characteristics of the particular call.

If, for example, it is determined that the call contains only one media which is voice, the call may directly be routed to the CS domain (similar to the second alternative discussed above). If it is determined that the call contains additional or alternative media (such as video), but this media can also be handled by the ISC-MSC 130, it may also be decided that the call can directly be routed to the CS domain after the services have been performed.

If, on the other hand, the ISC-MSC 130 determines that the call contains media that cannot be handled by the ISC-MSC 130, it may be decided to continue with the first handling alternative, at least if it is not clear whether or not further application servers need to be linked in the call path after the ISC-MSC 130. Otherwise, i.e. if it is clear that one or more further application servers need to be linked in (or if the call shall not directly brake out into the CS domain for other reasons), it may be decided to continue with the third handling alternative.

In a further embodiment, the routing of a call treated by the ISC-MSC 130 may also be dependent on the destination domain or, more specifically, on the received destination address. In the present protocol context the destination address may have in principle one of two different formats. The first format is the SIP uniform resource locator (SIP-URL) format indicating that the destination is most likely an IMS subscriber as well. The second format is the TEL uniform resource identifier (TEL-URI) format that can be mapped to an E.164 number and indicates that the destination is a CS subscriber outside the IMS domain.

If the ISC-MSC 130 determines that the destination address is of a SIP-URL format, it will be the best choice to keep the call in the IMS domain. This means that the ISC-MSC 130, under control of the routing component 150, will return the call to the S-CSCF 118 via the ISC interface 140. If, on the other hand, it is determined that the destination address is of a TEL-URI format, the routing component 150 will decide to pass call control via the BICC/ISUP interface 142 to the CS domain.

Figure 8:
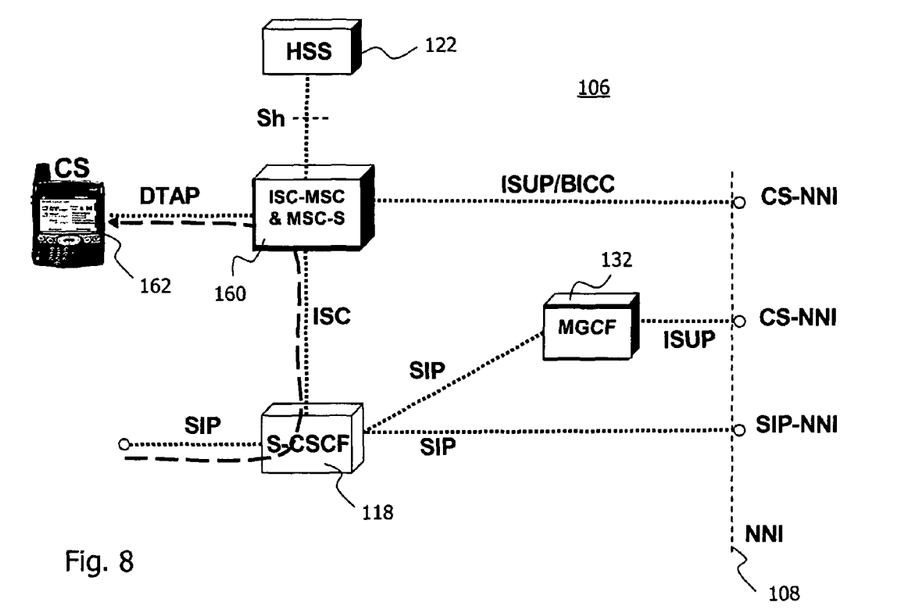
FIG. 8 is a third combined signalling/block diagram derived from the network embodiment shown in FIG. 4.

According to a still further embodiment shown in FIG. 8, the ISC-MSC 130 may be provided with a direct radio access. To this end, an MSC-S may be co-located with the ISC-MSC (e.g. by combining an MSC-S into the ISC-MSC 130), thus resulting in a combined ISC-MSC/MSC-S node 160. If it is determined, by the node 160, that the destination of the call is a user terminal 162 attached via the CS domain, and if the CS user terminal 162 is additionally attached to the particular MSC-S co-located with the ISC-MSC in the node 160, the call can directly be terminated via the DTAP protocol at the user terminal 162 without braking out to the CS-NNI 108. This direct termination is performed via the DTAP interface of the MSC-S included in the node 160. If, however, it is found that the CS user terminal 162 is attached to an MSC-S different from the MSC-S included in the node 160, CS brake out via the BICC/ISUP interface 142 of the ISC-MSC component will be required.

As has become apparent from the above description of preferred embodiments, the approach of having call services, and in particular telephony services, located in an ISC-MSC with direct brakeout in the CS domain provides a highly efficient call handling strategy for a frequent traffic case. Moreover, this approach allows the re-use of already available interfaces and network infrastructure (MSC-S) as in one implementation a ISC interface is added to an existing MSC-S. Furthermore, the transition to BICC-based CS networks can be facilitated as, in contrast to MSC-Ss, standard MGCFs are conventionally not provided with BICC capabilities.

While the current invention has been described in relation to its preferred embodiments, it is to be understood that this disclosure is only illustrative. Accordingly, it is intended that the invention be limited only by the scope of the claims appended hereto.

The invention claimed is:

1. An application server for providing circuit-switched (CS) services for a call, the application server comprising:
    a first Interface for receiving Packet Switched (PS) protocol messages requesting CS services for a call stretching between a PS domain and a CS domain through an Internet protocol multimedia subsystem (IMS) domain;
    a service component for providing the requested CS services for the call;
    a second interface (BICC/ISUP), configured as an integrated services digital network user part (ISUP) interface and a bearer independent call control (BICC) interface, for passing call control towards the CS domain after the CS services have been provided; and
    decision logic for deciding if call control is to be passed back via the first interface or if call control is to be passed via the second interface towards the CS domain,
    wherein the application server is an IMS server, which includes a microprocessor, executing stored instructions in an associated non-transitory memory to directly pass the call control to the CS domain at an application layer.
2. The application server of claim 1, further comprising a converter positioned between the first and second interfaces and adapted to convert content of the PS protocol messages in a format interpretable by the service component, wherein the service component provides the CS services in accordance with the converted content.
3. The application server of claim 1 further comprising at least one of a storage for subscriber data and a third interface for receiving subscriber data.
4. The application server of claim 1, further comprising the decision logic taking into account subscriber data associated with the call.
5. The application server of claim 3, further comprising the service component providing the CS services taking into account subscriber data associated with the call.
6. The application server of claim 1, wherein the PS protocol messages are Session Initiation Protocol (SIP) messages.
7. The application server of claim 1, wherein the first interface is configured as an Internet protocol multimedia subsystem service control (ISC) interface.
8. The application server of claim 1, further comprising the service component providing one or more functionalities of a mobile switching centre (MSC) or of an MSC server.
9. An Internet protocol multimedia subsystem (IMS) comprising an application server for providing circuit-switched (CS) services for a call, the application server comprising:
    a first Interface for receiving Packet Switched (PS) protocol messages that are requesting CS services for a call stretching between a packet-switched PS-domain and a CS domain through an Internet protocol multimedia subsystem (IMS) domain;
    a service component configured to provide the requested CS services for the call;
    a second interface (BICC/ISUP), configured as an integrated services digital network user part (ISUP) interface and a bearer independent call control (BICC) interface, for providing call control towards the CS domain after the CS services have been provided; and
    decision logic for deciding if call control is to be passed back via the first interface or if call control is to be passed via the second interface towards the CS domain,
    wherein the application server is an IMS server comprising a microprocessor executing instructions stored in an associated non-transitory memory to directly pass the call control to the CS domain at an application layer.
10. The IMS of claim 9, further comprising a Mobile Switching Center Server (MSC-S) co-located with the application server.
11. A method of providing circuit-switched (CS) services for a call in an application server of an Internet protocol multimedia subsystem (IMS), the method comprising the steps of:
    receiving packet switched (PS) protocol messages requesting CS services for a call stretching between a packet-switched domain and a CS domain through the IMS;
    providing the requested CS services for the call; and
    deciding if call control is to be passed back to a component in the PS domain or if call control is to be passed towards the CS domain;
    if call control is to be passed towards the CS domain, passing call control, via an interface (BICC/ISUP) configured as an integrated services digital network user part (ISUP) interface and a bearer independent call control (BICC) interface, to the CS domain after the CS services have been provided,
    wherein the call control is passed directly from the application server to the CS domain at an application layer.
12. The method of claim 11, wherein the application server is a dedicated one of a plurality of application servers, each of the application servers being adapted for being linked into a path of the call.
13. The method of claim 12, further comprising
    linking the dedicated application server, as a first application server, into the path of the call.
14. The method of claim 11, wherein the decision is based on one or more of subscriber data associated with the call; a requirement of linking further application servers into the call; a content type of the call; and a destination address of the call.

15. The method of claim 11, wherein enabling switching between two or more of the following modes of operation comprises:

mandatory passing of call control towards the CS domain;

mandatory passing of call control towards the PS domain; and dynamically deciding if call control is to be passed towards the PS domain or if call control is to be passed towards the CS domain.

16. The method of claim 11, wherein the provided CS services are telephony services.

* * * * *